(12) United States Patent
Pahlke

(10) Patent No.: US 12,319,539 B2
(45) Date of Patent: **\*Jun. 3, 2025**

(54) AIR PRESSURE FLOOR TABLE DETECTION: STATISTICAL ANALYSIS OF LOCATION

(71) Applicant: Otis Elevator Company, Farmington, CT (US)

(72) Inventor: Derk Oscar Pahlke, Berlin (DE)

(73) Assignee: OTIS ELEVATOR COMPANY, Farmington, CT (US)

( * ) Notice: Subject to any disclaimer, the term of this patent is extended or adjusted under 35 U.S.C. 154(b) by 1657 days.

This patent is subject to a terminal disclaimer.

(21) Appl. No.: 16/576,820

(22) Filed: Sep. 20, 2019

(65) Prior Publication Data

US 2021/0087018 A1 Mar. 25, 2021

(51) Int. Cl.
*B66B 1/36* (2006.01)
*B66B 1/34* (2006.01)
*G06F 3/048* (2013.01)

(52) U.S. Cl.
CPC .............. *B66B 1/36* (2013.01); *B66B 1/3446* (2013.01); *B66B 1/3492* (2013.01); *G06F 3/048* (2013.01)

(58) Field of Classification Search
CPC ................ B66B 1/3451; B66B 1/3423; B66B 1/3446–3461; B66B 1/3492; B66B 1/36;
(Continued)

(56) References Cited

U.S. PATENT DOCUMENTS 5,223,680 A * 6/1993 Schmidt-Milkau .......................... B66B 1/3492
187/394
6,526,368 B1 * 2/2003 Coste ....................... B66B 1/40
702/150

(Continued)

FOREIGN PATENT DOCUMENTS

CN 103058032 A 4/2013
CN 107416623 A 12/2017
(Continued)

OTHER PUBLICATIONS

Monteiro, Martin, et al; Using Smartphone Pressure Sensors to Measure Vertical Velocities of Eelevators, Stairways, and Drones; Universidad ORT Uruguay, Facultad de Ciencias, Universidad de la Rep; Jul. 1, 2016; 13 pages.

*Primary Examiner* — Christopher Uhlir
(74) *Attorney, Agent, or Firm* — CANTOR COLBURN LLP

(57) ABSTRACT

A method of monitoring motion of an elevator car within an elevator system is provided including: detecting, using a sensing apparatus, a plurality of pairs of corresponding data within a selected period of time, each pair of corresponding data including a detected elevator car height and a landing corresponding to the detected elevator car height; transmitting the plurality of pairs of corresponding data to a remote device for processing; determining, using the remote device, which of the landings of the plurality of pairs of corresponding data have a number of reoccurrences above a selected threshold; and determining, using the remote device, that pairs of corresponding data of the plurality of pairs of corresponding data are above the selected threshold, the pairs of corresponding data of the plurality of pairs of corresponding data include a landing with a number of reoccurrences above the selected threshold are correct pairs.

15 Claims, 9 Drawing Sheets

(58) Field of Classification Search
CPC ....... B66B 5/00; B66B 5/0006; B66B 5/0018; B66B 5/0037; B66B 5/0062; B66B 5/0087
See application file for complete search history.

(56) References Cited

U.S. PATENT DOCUMENTS

| | | | |
|---|---|---|---|
| 9,771,240 B2 * | 9/2017 | Martin | B66B 1/3492 |
| 10,113,869 B2 | 10/2018 | Sasaki | |
| 10,149,117 B2 | 12/2018 | Wirola et al. | |
| 10,315,885 B2 | 6/2019 | Kinnari et al. | |
| 10,378,907 B1 | 8/2019 | Akpinar et al. | |
| 11,639,283 B2 * | 5/2023 | Birrer | B66B 1/3492 187/393 |
| 2017/0059328 A1 | 3/2017 | Dousse et al. | |
| 2019/0064199 A1 | 2/2019 | Bogli et al. | |
| 2019/0152741 A1 | 5/2019 | Wedzikowski et al. | |
| 2019/0161320 A1 | 5/2019 | Hu | |
| 2021/0087017 A1 * | 3/2021 | Pahlke | B66B 13/22 |

FOREIGN PATENT DOCUMENTS

| | | |
|---|---|---|
| CN | 107651516 A | 2/2018 |
| CN | 108840190 A | 11/2018 |
| CN | 109466980 A | 3/2019 |
| CN | 109579846 A | 4/2019 |

* cited by examiner

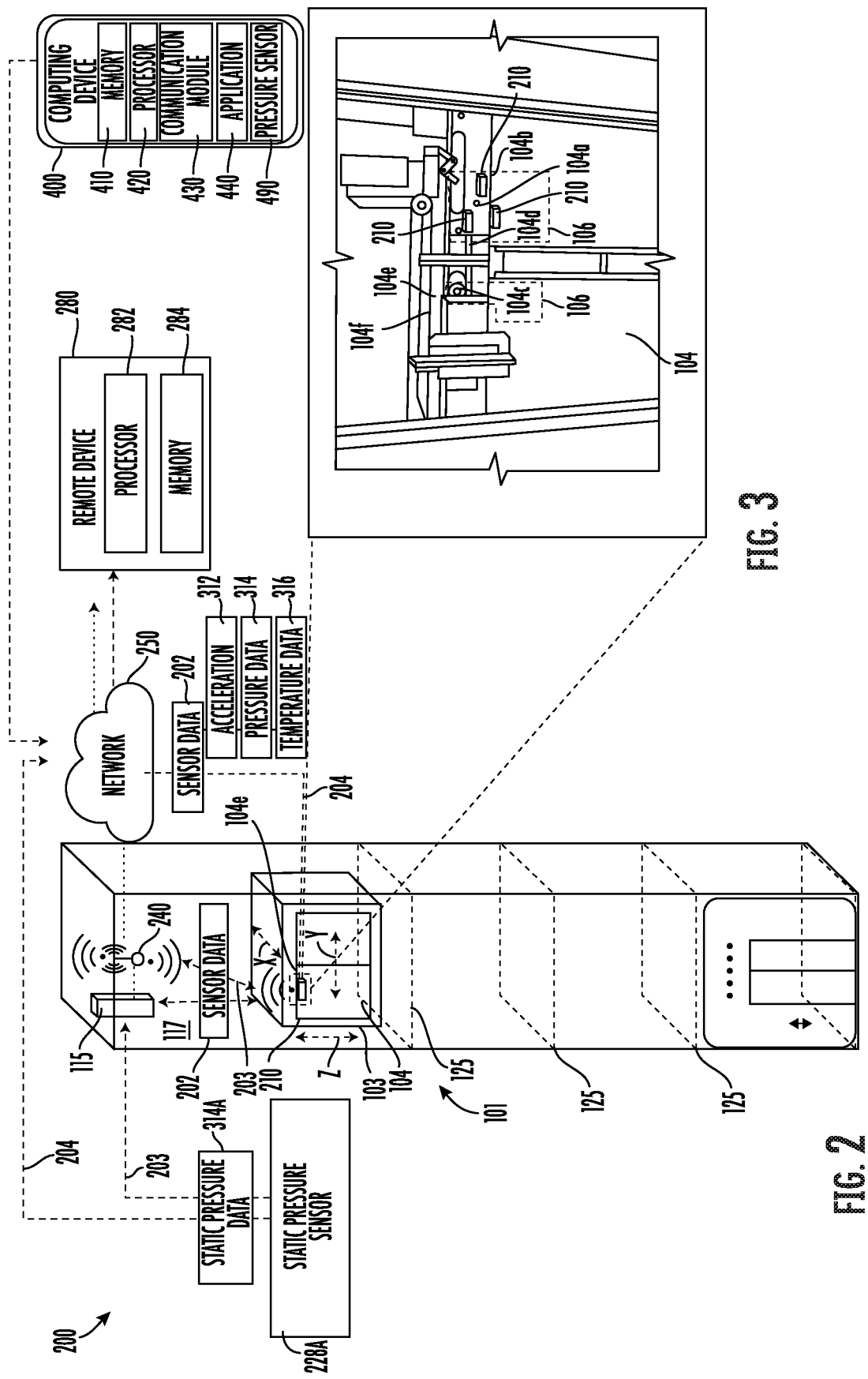

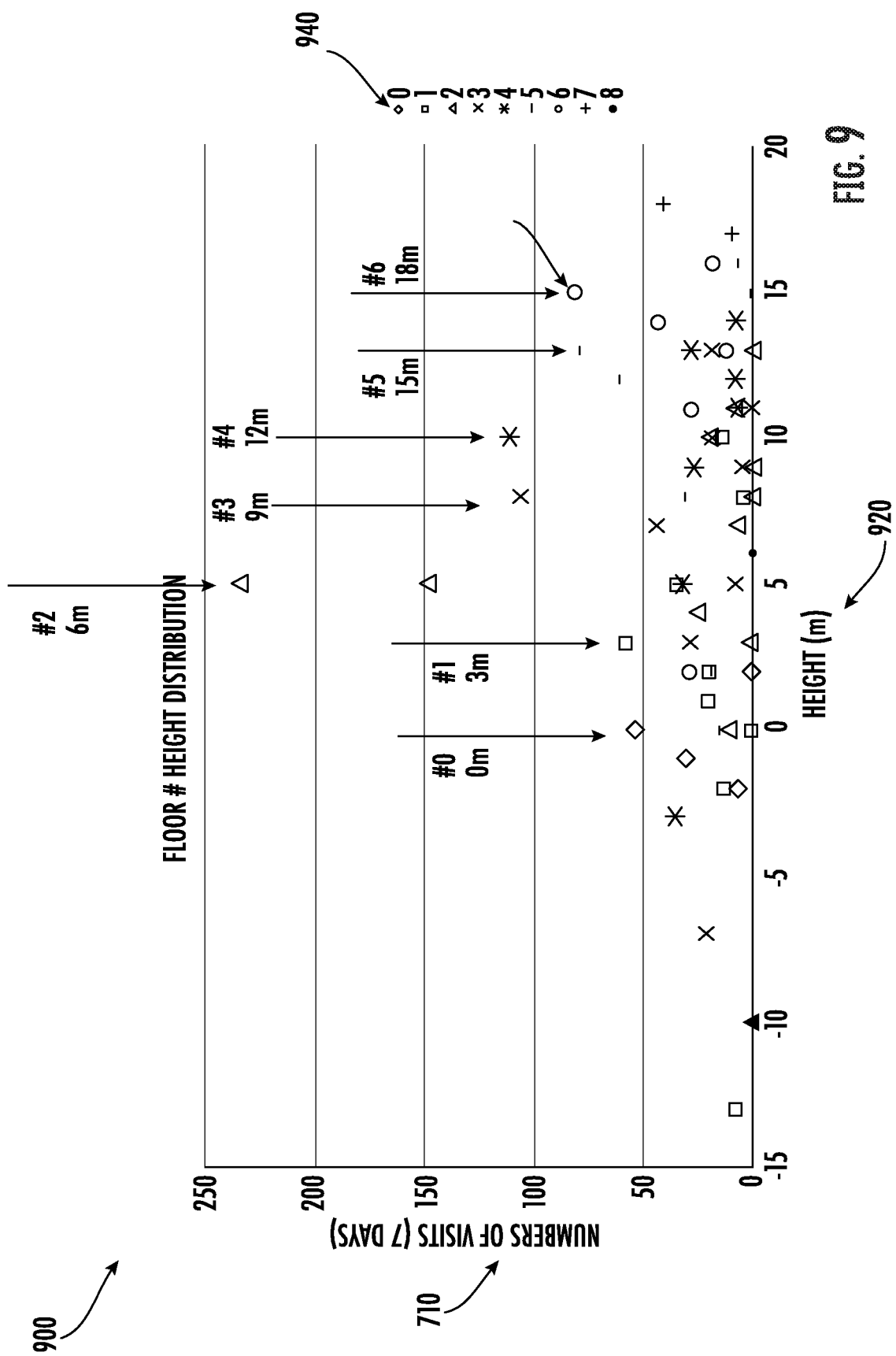

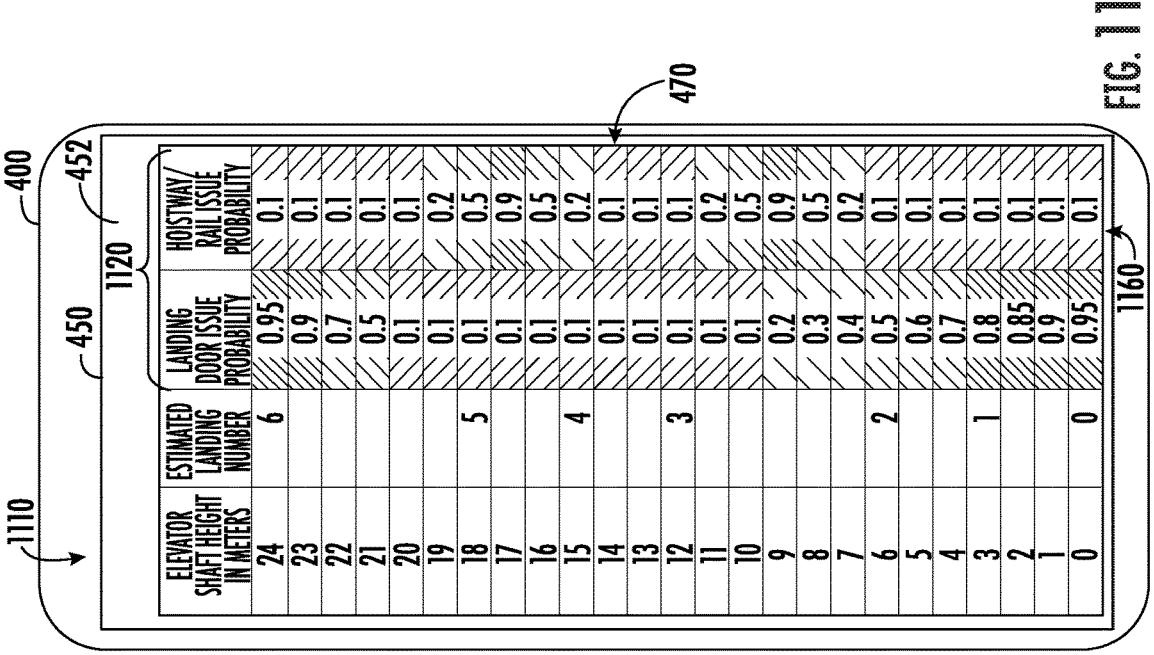
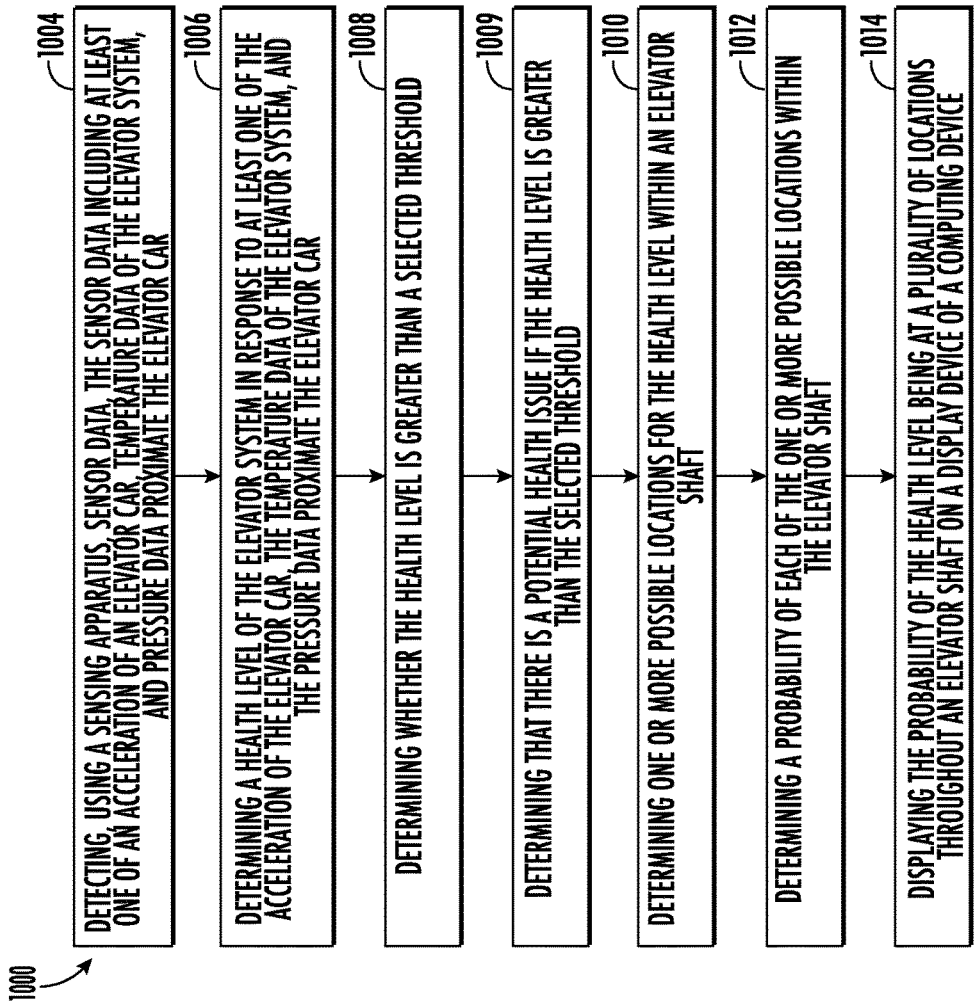

AIR PRESSURE FLOOR TABLE DETECTION: STATISTICAL ANALYSIS OF LOCATION

BACKGROUND

The embodiments herein relate to the field of conveyance systems, and specifically to a method and apparatus for monitoring a position of a conveyance apparatus of a conveyance system.

A precise position of a conveyance apparatus within a conveyance systems, such as, for example, elevator systems, escalator systems, and moving walkways may be difficult and/or costly to determine.

BRIEF SUMMARY

According to an embodiment, a method of monitoring motion of an elevator car within an elevator system is provided. The method including: detecting, using a sensing apparatus, a plurality of pairs of corresponding data within a selected period of time, each pair of corresponding data including a detected elevator car height and a landing corresponding to the detected elevator car height; transmitting the plurality of pairs of corresponding data to a remote device for processing; determining, using the remote device, which of the landings of the plurality of pairs of corresponding data have a number of reoccurrences above a selected threshold; and determining, using the remote device, that pairs of corresponding data of the plurality of pairs of corresponding data are above the selected threshold, the pairs of corresponding data of the plurality of pairs of corresponding data include a landing with a number of reoccurrences above the selected threshold are correct pairs.

In addition to one or more of the features described herein, or as an alternative, further embodiments may include: detecting, using a sensing apparatus, a first pair of corresponding data at a first time, the first pair of corresponding data including a first detected elevator car height at the first time and a first landing corresponding to the first detected elevator car height at the first time; transmitting the first pair of corresponding data to the remote device for processing; and matching, using the remote device, the first pair of corresponding data to one of the correct pairs to determine an actual landing of the elevator car at the first time.

In addition to one or more of the features described herein, or as an alternative, further embodiments may include: determining, using the remote device, that pairs of corresponding data of the plurality of pairs of corresponding data that do not include a landing with a number of reoccurrences above the selected threshold are incorrect pairs.

In addition to one or more of the features described herein, or as an alternative, further embodiments may include: removing, using the remote device, the incorrect pairs from a landing table generated and stored on the remote device.

In addition to one or more of the features described herein, or as an alternative, further embodiments may include: saving, using the remote device, the correct pairs in a landing table generated and stored on the remote device.

In addition to one or more of the features described herein, or as an alternative, further embodiments may include that the sensing apparatus further includes: at least one of a pressure sensor and an inertial measurement sensor, and wherein the plurality of pairs of corresponding data are detected using at least one of the pressure sensor and the inertial measurement sensor.

In addition to one or more of the features described herein, or as an alternative, further embodiments may include that the sensing apparatus further includes: at least one of a temperature sensor and a humidity sensor, and wherein the plurality of pairs of corresponding data are detected using at least one of the pressure sensor and the humidity sensor.

In addition to one or more of the features described herein, or as an alternative, further embodiments may include: normalizing, using a sensing apparatus, at least one of the plurality of pairs of corresponding data within the selected period of time.

According to another embodiment, a method of monitoring motion of an elevator car within an elevator system is provided. The method including: detecting, using a sensing apparatus, a plurality of pairs of corresponding data within a selected period of time, each pair of corresponding data including a detected elevator car height and a landing corresponding to the detected elevator car height; transmitting the plurality of pairs of corresponding data to a remote device for processing; determining, using the remote device, which of the plurality of pairs of corresponding data have a greatest number of reoccurrences for each landing; and determining, using the remote device, that pairs of corresponding data of the plurality of pairs of corresponding data that have the greatest number of reoccurrences for each landing are correct pairs.

In addition to one or more of the features described herein, or as an alternative, further embodiments may include: detecting, using a sensing apparatus, a first pair of corresponding data at a first time, the first pair of corresponding data including a first detected elevator car height at the first time and a first landing corresponding to the first detected elevator car height at the first time; transmitting the first pair of corresponding data to the remote device for processing; and matching, using the remote device, the first pair of corresponding data to one of the correct pairs to determine an actual landing of the elevator car at the first time.

In addition to one or more of the features described herein, or as an alternative, further embodiments may include: determining, using the remote device, that pairs of corresponding data of the plurality of pairs of corresponding data that do not have a minimum number of hits or visits are incorrect pairs.

In addition to one or more of the features described herein, or as an alternative, further embodiments may include: removing, using the remote device, the incorrect pairs from a landing table generated and stored on the remote device.

In addition to one or more of the features described herein, or as an alternative, further embodiments may include: saving, using the remote device, the correct pairs in a landing table generated and stored on the remote device.

In addition to one or more of the features described herein, or as an alternative, further embodiments may include that the sensing apparatus further includes: at least one of a pressure sensor and a inertial measurement sensor, wherein the plurality of pairs of corresponding data are detected using at least one of the pressure sensor and the inertial measurement sensor.

In addition to one or more of the features described herein, or as an alternative, further embodiments may include that the sensing apparatus further includes: at least one of a temperature sensor and a humidity sensor, wherein the plurality of pairs of corresponding data are detected using at least one of the temperature sensor and the humidity sensor.

In addition to one or more of the features described herein, or as an alternative, further embodiments may include: normalizing, using a sensing apparatus, at least one of the plurality of pairs of corresponding data within the selected period of time.

According to another embodiment, a computer program product embodied on a non-transitory computer readable medium, the computer program product including instructions that, when executed by a processor, cause the processor to perform operations including: detecting, using a sensing apparatus, a plurality of pairs of corresponding data within a selected period of time, each pair of corresponding data including a detected elevator car height and a landing corresponding to the detected elevator car height; transmitting the plurality of pairs of corresponding data to a remote device for processing; determining, using the remote device, which of the landings of the plurality of pairs of corresponding data have a number of reoccurrences above a selected threshold; and determining, using the remote device, that pairs of corresponding data of the plurality of pairs of corresponding data are above the selected threshold, the pairs of corresponding data of the plurality of pairs of corresponding data include a landing with a number of reoccurrences above the selected threshold are correct pairs.

In addition to one or more of the features described herein, or as an alternative, further embodiments may include that the operations further include: detecting, using a sensing apparatus, a first pair of corresponding data at a first time, the first pair of corresponding data including a first detected elevator car height at the first time and a first landing corresponding to the first detected elevator car height at the first time; transmitting the first pair of corresponding data to the remote device for processing; and matching, using the remote device, the first pair of corresponding data to one of the correct pairs to determine an actual landing of the elevator car at the first time.

In addition to one or more of the features described herein, or as an alternative, further embodiments may include that the operations further include: determining, using the remote device, that pairs of corresponding data of the plurality of pairs of corresponding data that do not include a landing with a number of reoccurrences above the selected threshold are incorrect pairs.

In addition to one or more of the features described herein, or as an alternative, further embodiments may include that the operations further include: removing, using the remote device, the incorrect pairs from a landing table generated and stored on the remote device.

Technical effects of embodiments of the present disclosure include determining a location of an elevator car through statistical analysis and/or displaying that location of the elevator car via a heat map.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The present disclosure is illustrated by way of example and not limited in the accompanying figures in which like reference numerals indicate similar elements.

FIG. 2 is a schematic illustration of a sensor system for the elevator system of FIG. 1, in accordance with an embodiment of the disclosure;

FIG. 3 is a schematic illustration of the location of sensing apparatus of the sensor system of FIG. 2, in accordance with an embodiment of the disclosure;

FIG. 9 is a chart a plotting a number of visits or hits for each height and corresponding landing pair of an elevator system during a selected period of time, in accordance with an embodiment of the disclosure;

FIG. 10 is a flow chart of a method of monitoring health of an elevator system, in accordance with an embodiment of the disclosure; and FIG. 11 illustrates a mobile device graphical user interface for viewing and interacting with an application, in accordance with an embodiment of the disclosure.

DETAILED DESCRIPTION

Figure 1:
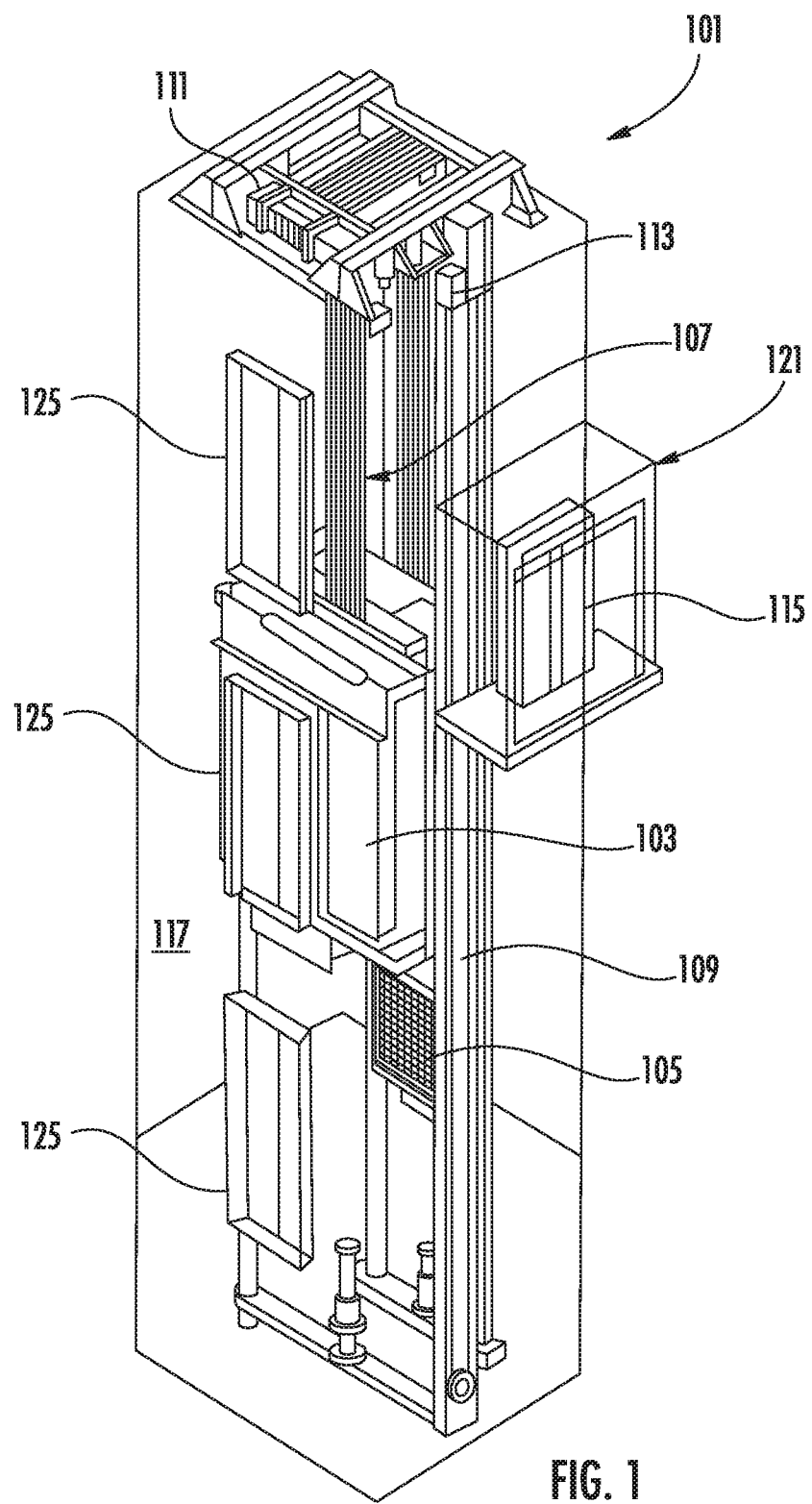
FIG. 1 is a schematic illustration of an elevator system that may employ various embodiments of the present disclosure.

FIG. 1 is a perspective view of an elevator system 101 including an elevator car 103, a counterweight 105, a tension member 107, a guide rail 109, a machine 111, a position reference system 113, and a controller 115. The elevator car 103 and counterweight 105 are connected to each other by the tension member 107. The tension member 107 may include or be configured as, for example, ropes, steel cables, and/or coated-steel belts. The counterweight 105 is configured to balance a load of the elevator car 103 and is configured to facilitate movement of the elevator car 103 concurrently and in an opposite direction with respect to the counterweight 105 within an elevator shaft 117 and along the guide rail 109.

The tension member 107 engages the machine 111, which is part of an overhead structure of the elevator system 101. The machine 111 is configured to control movement between the elevator car 103 and the counterweight 105. The position reference system 113 may be mounted on a fixed part at the top of the elevator shaft 117, such as on a support or guide rail, and may be configured to provide position signals related to a position of the elevator car 103 within the elevator shaft 117. In other embodiments, the position reference system 113 may be directly mounted to a moving component of the machine 111, or may be located in other positions and/or configurations as known in the art. The position reference system 113 can be any device or mechanism for monitoring a position of an elevator car and/or counter weight, as known in the art. For example, without limitation, the position reference system 113 can be an encoder, sensor, or other system and can include velocity sensing, absolute position sensing, etc., as will be appreciated by those of skill in the art.

The controller 115 is located, as shown, in a controller room 121 of the elevator shaft 117 and is configured to control the operation of the elevator system 101, and particularly the elevator car 103. For example, the controller 115 may provide drive signals to the machine 111 to control the acceleration, deceleration, leveling, stopping, etc. of the elevator car 103. The controller 115 may also be configured to receive position signals from the position reference system 113 or any other desired position reference device. When moving up or down within the elevator shaft 117 along guide rail 109, the elevator car 103 may stop at one or more landings 125 as controlled by the controller 115. Although shown in a controller room 121, those of skill in the art will appreciate that the controller 115 can be located and/or configured in other locations or positions within the elevator system 101. In one embodiment, the controller may be located remotely or in the cloud.

The machine 111 may include a motor or similar driving mechanism. In accordance with embodiments of the disclosure, the machine 111 is configured to include an electrically driven motor. The power supply for the motor may be any power source, including a power grid, which, in combination with other components, is supplied to the motor. The machine 111 may include a traction sheave that imparts force to tension member 107 to move the elevator car 103 within elevator shaft 117.

Although shown and described with a roping system including tension member 107, elevator systems that employ other methods and mechanisms of moving an elevator car within an elevator shaft may employ embodiments of the present disclosure. For example, embodiments may be employed in ropeless elevator systems using a linear motor to impart motion to an elevator car. Embodiments may also be employed in ropeless elevator systems using a hydraulic lift to impart motion to an elevator car. FIG. 1 is merely a non-limiting example presented for illustrative and explanatory purposes.

In other embodiments, the system comprises a conveyance system that moves passengers between floors and/or along a single floor. Such conveyance systems may include escalators, people movers, etc. Accordingly, embodiments described herein are not limited to elevator systems, such as that shown in FIG. 1. In one example, embodiments disclosed herein may be applicable conveyance systems such as an elevator system 101 and a conveyance apparatus of the conveyance system such as an elevator car 103 of the elevator system 101. In another example, embodiments disclosed herein may be applicable conveyance systems such as an escalator system and a conveyance apparatus of the conveyance system such as a moving stair of the escalator system.

Referring now to FIG. 2, with continued referenced to FIG. 1, a view of a sensor system 200 including a sensing apparatus 210 is illustrated, according to an embodiment of the present disclosure. The sensing apparatus 210 is configured to detect sensor data 202 of the elevator car 103 and transmit the sensor data 202 to a remote device 280. Sensor data 202 may include but is not limited to pressure data 314, vibratory signatures (i.e., vibrations over a period of time) or accelerations 312 and derivatives or integrals of accelerations 312 of the elevator car 103, such as, for example, distance, velocity, jerk, jounce, snap . . . etc. Sensor data 202 may also include light, sound, humidity, and temperature data 316, or any other desired data parameter. The pressure data 314 may include atmospheric air pressure within the elevator shaft 117. It should be appreciated that, although particular systems are separately defined in the schematic block diagrams, each or any of the systems may be otherwise combined or separated via hardware and/or software. For example, the sensing apparatus 210 may be a single sensor or may be multiple separate sensors that are interconnected.

In an embodiment, the sensing apparatus 210 is configured to transmit sensor data 202 that is raw and unprocessed to the controller 115 of the elevator system 101 for processing. In another embodiment, the sensing apparatus 210 is configured to process the sensor data 202 prior to transmitting the sensor data 202 to the controller 115 through a processing method, such as, for example, edge processing. In another embodiment, the sensing apparatus 210 is configured to transmit sensor data 202 that is raw and unprocessed to a remote device 280 for processing. In yet another embodiment, the sensing apparatus 210 is configured to process the sensor data 202 prior to transmitting the sensor data 202 to the remote device 280 through a processing method, such as, for example, edge processing.

The processing of the sensor data 202 may reveal data, such as, for example, a number of elevator door openings/closings, elevator door time, vibrations, vibratory signatures, a number of elevator rides, elevator ride performance, elevator flight time, probable car position (e.g. elevation, floor number), releveling events, rollbacks, elevator car 103 x, y acceleration at a position: (i.e., rail topology), elevator car 103 x, y vibration signatures at a position: (i.e., rail topology), door performance at a landing number, nudging event, vandalism events, emergency stops, etc.

The remote device 280 may be a computing device, such as, for example, a desktop, a cloud based computer, and/or a cloud based artificial intelligence (AI) computing system. The remote device 280 may also be a computing device that is typically carried by a person, such as, for example a smartphone, PDA, smartwatch, tablet, laptop, etc. The remote device 280 may also be two separate devices that are synced together, such as, for example, a cellular phone and a desktop computer synced over an interne connection.

The remote device 280 may be an electronic controller including a processor 282 and an associated memory 284 comprising computer-executable instructions that, when executed by the processor 282, cause the processor 282 to perform various operations. The processor 282 may be, but is not limited to, a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 284 may be but is not limited to a random access memory (RAM), read only memory (ROM), or other electronic, optical, magnetic or any other computer readable medium.

The sensing apparatus 210 is configured to transmit the sensor data 202 to the controller 115 or the remote device 280 via short-range wireless protocols 203 and/or long-range wireless protocols 204. Short-range wireless protocols 203 may include but are not limited to Bluetooth, BLE, Wi-Fi, HaLow (801.11ah), zWave, ZigBee, or Wireless M-Bus. Using short-range wireless protocols 203, the sensing apparatus 210 is configured to transmit the sensor data 202 directly to the controller 115 or to a local gateway device 240 and the local gateway device 240 is configured to transmit the sensor data 202 to the remote device 280 through a network 250 or to the controller 115. The network 250 may be a computing network, such as, for example, a cloud computing network, cellular network, or any other computing network known to one of skill in the art. Using long-range wireless protocols 204, the sensing apparatus 210 is configured to transmit the sensor data 202 to the remote device 280 through a network 250. Long-range wireless protocols 204 may include but are not limited to cellular 2G, 3G, LTE (NB-IoT, CAT M1), LoRa, Satellite, Ingenu, or SigFox.

The sensing apparatus 210 may be configured to detect sensor data 202 including acceleration in any number of directions. In an embodiment, the sensing apparatus may detect sensor data 202 including accelerations 312 along three axis, an X axis, a Y axis, and a Z axis, as show in in FIG. 2. The X axis may be perpendicular to the doors 104 of the elevator car 103, as shown in FIG. 2. The Y axis may be parallel to the doors 104 of the elevator car 103, as shown in FIG. 2. The Z axis may be aligned vertically parallel with the elevator shaft 117 and pull of gravity, as shown in FIG. 2. The acceleration data 312 may reveal vibratory signatures generated along the X-axis, the Y-axis, and the Z-axis.

The sensor system 200 includes a static pressure sensor 228A configured to detect static pressure data 314A, which includes a static atmospheric air pressure. The static pressure sensor 228A is located at a static or stationary location off of the elevator car 103. Thereby, a change in static atmospheric air pressure may be solely caused by the weather and not by movement of the elevator car 103.

The static pressure sensor 228A is configured to transmit the static pressure data 314A to the controller 115 or the remote device 280 via short-range wireless protocols 203 and/or long-range wireless protocols 204. Short-range wireless protocols 203 may include but are not limited to Bluetooth, BLE, Wi-Fi, HaLow (801.11ah), zWave, ZigBee, or Wireless M-Bus. Using short-range wireless protocols 203, the static pressure sensor 228A is configured to transmit the static pressure data 314A directly to the controller 115 or to a local gateway device 240 and the local gateway device 240 is configured to transmit the static pressure data 314A to the remote device 280 through a network 250 or to the controller 115. The network 250 may be a computing network, such as, for example, a cloud computing network, cellular network, or any other computing network known to one of skill in the art. Using long-range wireless protocols 204, the static pressure sensor 228A is configured to transmit the static pressure data 314A to the remote device 280 through a network 250. Long-range wireless protocols 204 may include but are not limited to cellular, 2G, 3G, LTE (NB-IoT, CAT M1), LoRa, Satellite, Ingenu, or SigFox.

Also shown in FIG. 2 is a computing device 400. The computing device 400 may belong to an elevator mechanic/technician working on the elevator system 101. The computing device 400 may be a computing device such as a desktop computer or a mobile computing device that is typically carried by a person, such as, for example a smart phone, PDA, smart watch, tablet, laptop, etc. The computing device 400 may include a display device 450 (see FIG. 11) so that the mechanic may visually see a health level (i.e., health score) of the elevator system 101. The computing device 400 may include a processor 420, memory 410, a communication module 430, and an application 440, as shown in FIG. 2. The processor 420 can be any type or combination of computer processors, such as a microprocessor, microcontroller, digital signal processor, application specific integrated circuit, programmable logic device, and/or field programmable gate array. The memory 410 is an example of a non-transitory computer readable storage medium tangibly embodied in the computing device 400 including executable instructions stored therein, for instance, as firmware. The communication module 430 may implement one or more communication protocols, such as, for example, short-range wireless protocols 203 and long-range wireless protocols 204. The communication module 430 may be in communication with at least one of the controller 115, the sensing apparatus 210, the network 250, and the remote device 280. In an embodiment, the communication module 430 may be in communication with the remote device 280 through the network 250.

The communication module 430 is configured to receive a health level of the elevator system 101 from at least one of the controller 115, the sensing apparatus 210, the network 250, and the remote device 280. In an embodiment, the communication module 430 is configured to receive a health level from the remote device 280. The remote device 280 may generate the health level after receiving sensor date 202 from the sensing apparatus 210. The application 440 is configured to generate a graphical user interface on the computing device 400 (see FIG. 11). The application 440 may be computer software installed directly on the memory 410 of the computing device 400 and/or installed remotely and accessible through the computing device 400 (e.g., software as a service).

The computing device 400 may also include a pressure sensor 490 configured to detect an ambient air pressure local to the computing device 400, such as, for example, atmospheric air pressure. The pressure sensor 490 may be a pressure altimeter or barometric altimeter in two non-limiting examples. The pressure sensor 490 is in communication with the processor 420 and the processor 420 may be configured to determine a height or elevation of the computing device 400 in response to the ambient air pressure detected local to the computing device 400. A height or elevation of the computing device 400 may be determined using other location determination methods, including, but not limited to, cell triangulation, a global positioning system (GPS) and/or detection of wireless signal strength (e.g., received signal strength (RSS) using Bluetooth, BLE, Wi-FI, . . . etc).

FIG. 3 shows a possible installation location of the sensing apparatus 210 within the elevator system 101. The sensing apparatus 210 may include a magnet (not show) to removably attach to the elevator car 103. In the illustrated embodiment shown in FIG. 3, the sensing apparatus 210 may be installed on the door hanger 104a and/or the door 104 of the elevator system 101. It is understood that the sensing apparatus 210 may also be installed in other locations other than the door hanger 104a and the door 104 of the elevator system 101. It is also understood that multiple sensing apparatus 210 are illustrated in FIG. 3 to show various locations of the sensing apparatus 210 and the embodiments disclosed herein may include one or more sensing apparatus 210. In another embodiment, the sensing apparatus 210 may be attached to a door header 104e of a door 104 of the elevator car 103. In another embodiment, the sensing apparatus 210 may be located on a door header 104e proximate a top portion 104f of the elevator car 103. In another embodiment, the sensing apparatus 210 is installed elsewhere on the elevator car 103, such as, for example, directly on the door 104.

As shown in FIG. 3, the sensing apparatus 201 may be located on the elevator car 103 in the selected areas 106, as shown in FIG. 3. The doors 104 are operably connected to the door header 104e through a door hanger 104a located proximate a top portion 104b of the door 104. The door hanger 104a includes guide wheels 104c that allow the door 104 to slide open and close along a guide rail 104d on the door header 104e. Advantageously, the door hanger 104a is an easy to access area to attach the sensing apparatus 210 because the door hanger 104a is accessible when the elevator car 103 is at landing 125 and the elevator door 104 is open. Thus, installation of the sensing apparatus 210 is possible without taking special measures to take control over the elevator car 103. For example, the additional safety of an emergency door stop to hold the elevator door 104 open is not necessary as door 104 opening at landing 125 is a normal operation mode. The door hanger 104a also provides ample clearance for the sensing apparatus 210 during operation of the elevator car 103, such as, for example, door 104 opening and closing. Due to the mounting location of the sensing apparatus 210 on the door hanger 104a, the sensing apparatus 210 may detect open and close motions (i.e., acceleration) of the door 104 of the elevator car 103 and a door at the landing 125. Additionally mounting the sensing apparatus 210 on the hanger 104a allows for recording of a ride quality of the elevator car 103.

Figure 4:
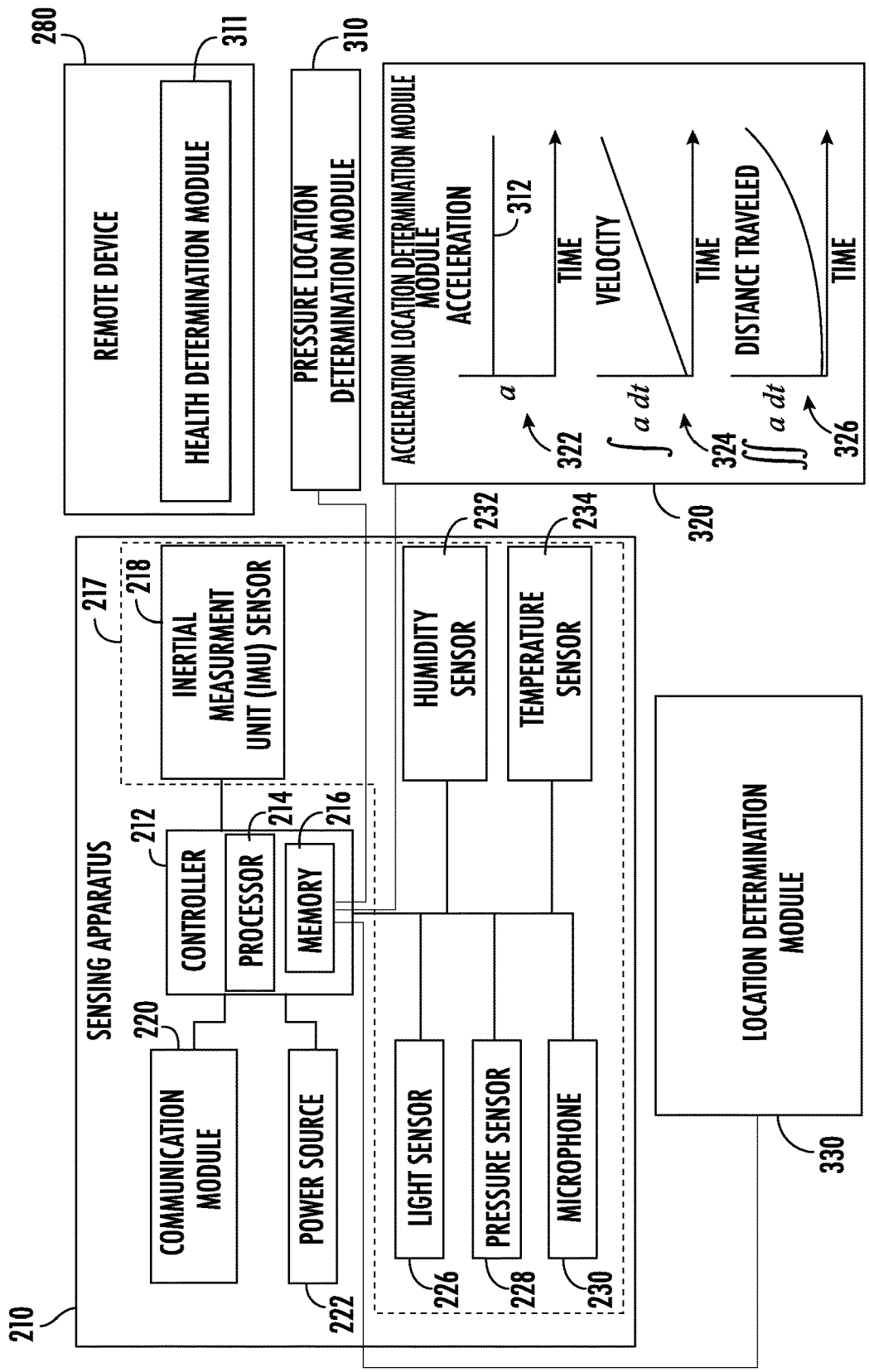
FIG. 4 is a schematic illustration of a sensing apparatus of the sensor system of FIG. 2, in accordance with an embodiment of the disclosure.

FIG. 4 illustrates a block diagram of the sensing apparatus 210 of the sensing system of FIGS. 2 and 3. It should be appreciated that, although particular systems are separately defined in the schematic block diagram of FIG. 4, each or any of the systems may be otherwise combined or separated via hardware and/or software. As shown in FIG. 4, the sensing apparatus 210 may include a controller 212, a plurality of sensors 217 in communication with the controller 212, a communication module 220 in communication with the controller 212, and a power source 222 electrically connected to the controller 212.

The plurality of sensors 217 includes an inertial measurement unit (IMU) sensor 218 configured to detect sensor data 202 including accelerations 312 of the sensing apparatus 210 and the elevator car 103 when the sensing apparatus 210 is attached to the elevator car 103. The IMU sensor 218 may be a sensor, such as, for example, an accelerometer, a gyroscope, or a similar sensor known to one of skill in the art. The accelerations 312 detected by the IMU sensor 218 may include accelerations 312 as well as derivatives or integrals of accelerations, such as, for example, velocity, jerk, jounce, snap . . . etc. The IMU sensor 218 is in communication with the controller 212 of the sensing apparatus 210.

The plurality of sensors 217 includes a pressure sensor 228 is configured to detect sensor data 202 including pressure data 314, such as, for example, atmospheric air pressure within the elevator shaft 117. The pressure sensor 228 may be a pressure altimeter or barometric altimeter in two non-limiting examples. The pressure sensor 228 is in communication with the controller 212.

The plurality of sensors 217 may also include additional sensors including but not limited to a light sensor 226, a pressure sensor 228, a microphone 230, a humidity sensor 232, and a temperature sensor 234. The light sensor 226 is configured to detect sensor data 202 including light exposure. The light sensor 226 is in communication with the controller 212. The microphone 230 is configured to detect sensor data 202 including audible sound and sound levels. The microphone 230 is in communication with the controller 212. The humidity sensor 232 is configured to detect sensor data 202 including humidity levels. The humidity sensor 232 is in communication with the controller 212. The temperature sensor 234 is configured to detect sensor data 202 including temperature levels. The temperature sensor 234 is in communication with the controller 212.

The controller 212 of the sensing apparatus 210 includes a processor 214 and an associated memory 216 comprising computer-executable instructions that, when executed by the processor 214, cause the processor 214 to perform various operations, such as, for example, edge pre-processing or processing the sensor data 202 collected by the IMU sensor 218, the light sensor 226, the pressure sensor 228, the microphone 230, the humidity sensor 232, and the temperature sensor 234. In an embodiment, the controller 212 may process the accelerations 312 and/or the pressure data 314 in order to determine a probable location of the elevator car 103, discussed further below. The processor 214 may be but is not limited to a single-processor or multi-processor system of any of a wide array of possible architectures, including field programmable gate array (FPGA), central processing unit (CPU), application specific integrated circuits (ASIC), digital signal processor (DSP) or graphics processing unit (GPU) hardware arranged homogenously or heterogeneously. The memory 216 may be a storage device, such as, for example, a random access memory (RAM), read only memory (ROM), or other electronic, optical, magnetic or any other computer readable medium.

The power source 222 of the sensing apparatus 210 is configured to store and supply electrical power to the sensing apparatus 210. The power source 222 may include an energy storage system, such as, for example, a battery system, capacitor, or other energy storage system known to one of skill in the art. The power source 222 may also generate electrical power for the sensing apparatus 210. The power source 222 may also include an energy generation or electricity harvesting system, such as, for example synchronous generator, induction generator, or other type of electrical generator known to one of skill in the art.

The sensing apparatus 210 includes a communication module 220 configured to allow the controller 212 of the sensing apparatus 210 to communicate with the remote device 280 and/or controller 115 through at least one of short-range wireless protocols 203 and long-range wireless protocols 204. The communication module 220 may be configured to communicate with the remote device 280 using short-range wireless protocols 203, such as, for example, Bluetooth, BLE, Wi-Fi, HaLow (801.11ah), Wireless M-Bus, zWave, ZigBee, or other short-range wireless protocol known to one of skill in the art. Using short-range wireless protocols 203, the communication module 220 is configured to transmit the sensor data 202 to a local gateway device 240 and the local gateway device 240 is configured to transmit the sensor data 202 to a remote device 280 through a network 250, as described above. The communication module 220 may be configured to communicate with the remote device 280 using long-range wireless protocols 204, such as for example, cellular, LTE (NB-IoT, CAT M1), LoRa, Ingenu, SigFox, Satellite, or other long-range wireless protocol known to one of skill in the art. Using long-range wireless protocols 204, the communication module 220 is configured to transmit the sensor data 202 to a remote device 280 through a network 250. In an embodiment, the short-range wireless protocol 203 is sub GHz Wireless M-Bus. In another embodiment, the long-range wireless protocol is SigFox. In another embodiment, the long-range wireless protocol is LTE NB-IoT or CAT M1 with 2G, 3G fallback.

The sensing apparatus 210 includes a location determination module 330 configured to determine a location (i.e., position) of the elevator car 103 within the elevator shaft 117. The location of the elevator car 103 (i.e., elevator car location) may be fixed locations along the elevator shaft 117, such as for example, the landings 125 of the elevator shaft 117. The elevator car locations may be equidistantly spaced apart along the elevator shaft 117 such as, for example, 5 meters or any other selected distance. Alternatively, the elevator car locations may be or intermittently spaced apart along the elevator shaft 117.

The location determination module 330 may utilize various approaches to determine a location of the elevator car 103 (i.e., elevator car location) within the elevator shaft 117. The location determination module 330 may be configured to determine a location of the elevator car 103 within the elevator shaft 117 using at least one of a pressure location determination module 310 and an acceleration location determination module 320.

The acceleration location determination module 320 is configured to determine a distance traveled of the elevator car 103 within the elevator shaft 117 in response to the acceleration of the elevator car 103 detected along the Y axis. The sensing apparatus 210 may detect an acceleration along the Y axis shown at 322 and may integrate the acceleration to get a velocity of the elevator car 103 at 324. At 326, the sensing apparatus 210 may also integrate the velocity of the elevator car 103 to determine a distance traveled by the elevator car 103 within the elevator shaft 117 during the acceleration 312 detected at 322. The direction of travel of the elevator car 103 may also be determined in response to the acceleration 312 detected. The location determination module 330 may then determine the location of the elevator car 103 within the elevator shaft 117 in response to a starting location and a distance traveled away from that starting location. The starting location may be based upon tracking the past operation and/or movement of the elevator car 103.

The pressure location determination module 310 is configured to detect an atmospheric air pressure within the elevator shaft 117 when the elevator car 103 is in motion and/or stationary using the pressure sensor 228. The pressure detected by the pressure sensor 228 may be associated with a location (e.g., height, elevation) within the elevator shaft 117 through either a look up table or a calculation of altitude using the barometric pressure change in two non-limiting embodiments. The direction of travel of the elevator car 103 may also be determined in response to the change in pressure detected via the pressure data 314. The pressure sensor 228 may need to periodically detect a baseline pressure to account for changes in atmospheric pressure due to local weather conditions. For example, this baseline pressure may need to be detected daily, hourly, or weekly in non-limiting embodiments. In some embodiments, the baseline pressure may be detected whenever the elevator car 103 is stationary, or at certain intervals when the elevator car 103 is stationary and/or at a known location. The acceleration of the elevator car 103 may also need to be detected to know when the elevator car 103 is stationary and then when the elevator car 103 is stationary the sensing apparatus 210 may need to be offset to compensate the sensor drift and environment drift.

In one embodiment, the pressure location determination module 310 may be used to verify and/or modify a location of the elevator car 102 within the elevator shaft 117 determined by the acceleration location determination module 320. In another embodiment, the acceleration location determination module 320 may be used to verify and/or modify a location of the elevator car 102 within the elevator shaft 117 determined by the pressure location determination module 310. In another embodiment, the pressure location determination module 310 may be prompted to determine a location of the elevator car 103 within the elevator shaft 117 in response to an acceleration detected by the IMU sensor 218.

In one embodiment, a health determination module 311 may process the sound detected by the microphone 230, the light detected by the light sensor 226, the humidity detected by the humidity sensor 232, the temperature data 316 detected by the temperature sensor 234, the accelerations 312 detected by the IMU sensor 218, and/or the pressure data 314 detected by the pressure sensor 228 in order to determine a health level (see FIG. 11) of the elevator system 101.

The health determination module 311 may be located on the remote device 280 or the sensing apparatus 210. In an embodiment, the health determination module 311 is located on the remote device 280. In an embodiment, the remote device 280 may process the sound detected by the microphone 230, the light detected by the light sensor 226, the humidity detected by the humidity sensor 232, the temperature data 316 detected by the temperature sensor 234, the accelerations 312 detected by the IMU sensor 218, and/or the pressure data 314 detected by the pressure sensor 228 in order to determine a health level of the elevator system 101. In an embodiment, the remote device 280 may process the temperature data 316 detected by the temperature sensor 234, the accelerations 312 detected by the IMU sensor 218, and the pressure data 314 detected by the pressure sensor 228 in order to determine a health level of the elevator system 101.

The health level may be a graded scale indicating the health of the elevator system 101 and/or components of the elevator system. In a non-limiting example, the health level may be graded on a scale of one-to-ten with a health level equivalent to one being the lowest health level and a health level equivalent to ten being the highest health level. In another non-limiting example, the health level may be graded on a scale of one-to-one-hundred percent with a health level equivalent to one percent being the lowest health level and a health level equivalent to one-hundred percent being the highest health level. In another non-limiting example, the health level may be graded on a scale of colors with a health level equivalent to red being the lowest health level and a health level equivalent to green being the highest health level. The health level may be determined in response to at least one of the accelerations 312, the pressure data 314, and/or the temperature data 316. For example, accelerations 312 above a threshold acceleration (e.g., normal operating acceleration) in any one of the X axis, a Y axis, and a Z axis may be indicative of a low health level. In another example, elevated temperature data 316 above a threshold temperature for components may be indicative of a low health level.

The remote device 280 is configured to assign a determined health level to probable locations (e.g., elevator car locations) along the elevator shaft 117 where the health level was determined. The probably that the determined health level is existent at a particular location may be display via a heat map as illustrated in FIG. 11. The health level may then be communicated to the computing device 400 where it is visible to a user of the computing device 400. The health level of the elevator system 101 may be determined at various locations along the elevator shaft 117. In one example, the health level of the elevator system 101 may be determined equidistantly along the elevator shaft 117. In another example, the health level of the elevator system 101 may be determined at each landing 125 along the elevator shaft 117.

Figure 5:
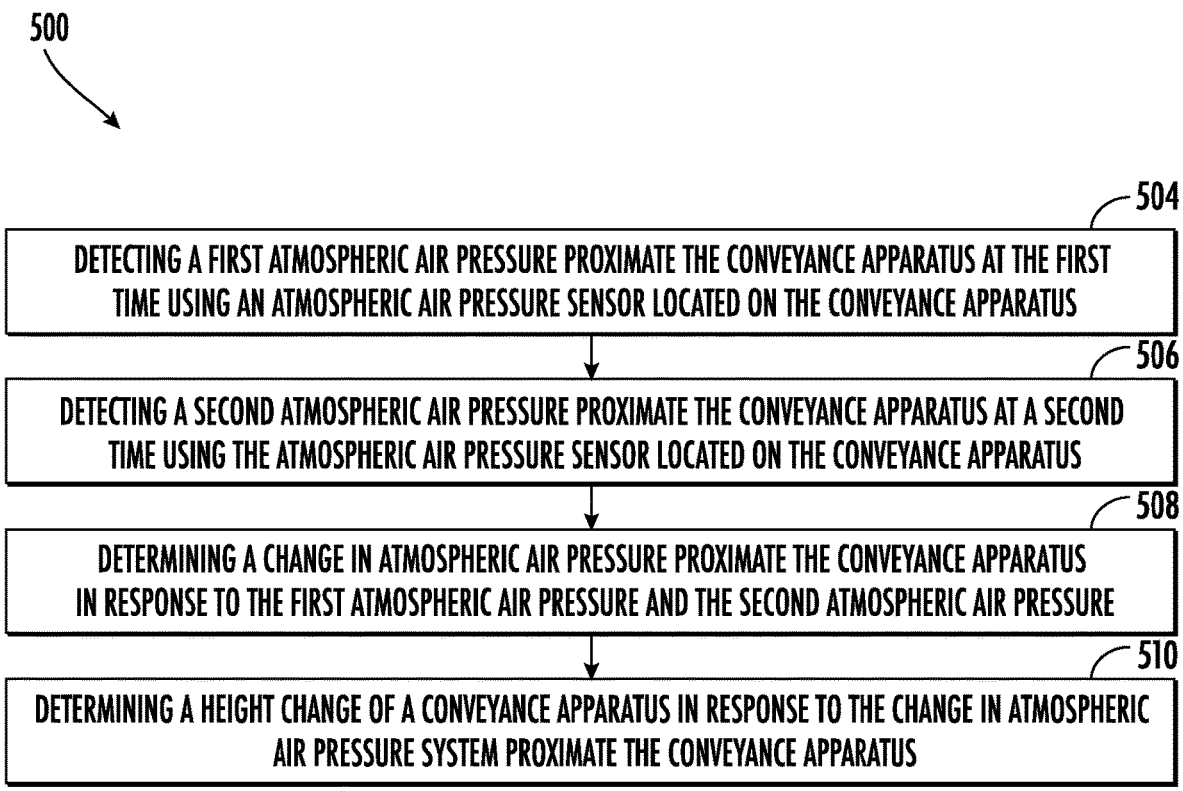
FIG. 5 is a flow chart of a method of monitoring motion of a conveyance apparatus within a conveyance system, in accordance with an embodiment of the disclosure.

Referring now to FIG. 5, while referencing components of FIGS. 1-4. FIG. 5 shows a flow chart of a method 500 of monitoring motion of a conveyance apparatus within a conveyance system, in accordance with an embodiment of the disclosure. In an embodiment, the conveyance system is an elevator system 101 and the conveyance apparatus is an elevator car 103. In an embodiment, the method 500 may be performed by at least one of the sensing apparatus 210, the controller 115, and the remote device 280.

At block 504, a first atmospheric air pressure is detected proximate the conveyance apparatus at the first time using a pressure sensor 228 located on the conveyance apparatus. At block 506, a second atmospheric air pressure is detected proximate the conveyance apparatus at a second time using the pressure sensor 228 located on the conveyance apparatus. At block 508, a change in atmospheric air pressure proximate the conveyance apparatus is determined in response to the first atmospheric air pressure and the second atmospheric air pressure. At block 510, a height change of a conveyance apparatus is determined in response to the change in atmospheric air pressure proximate the conveyance apparatus. As the conveyance apparatus changes in height the air pressure also changes, thus by maintaining table comprising a pressure and associated height for that pressure one may determine the height merely by detecting pressure. The standard table may have been developed through testing and/or a learn run. The height change may be confirmed or disconfirmed using at least one of a rate of change in atmospheric air pressure prior to the first time, an acceleration of the conveyance apparatus, a rate of change in static atmospheric air pressure, a rate of change in temperature, and a rate of change in relative humidity detection Weather changes that bring changes in local air pressure may provide false readings to the method 500, thus additional parameters may be used to confirm movement of the conveyance apparatus, such as, for example, local weather parameters, temperature, relative humidity, static atmospheric air pressure, or acceleration. Local weather parameters may change along with pressure, such as, for example, temperature and relative humidity. Static pressure is measured at a static or stationary location off of the conveyance apparatus, which moves. Thereby, a change in static atmospheric air pressure may be solely caused by the weather. Thus, the static pressure detected by the static pressure sensor 228 may be compared used to correct or normalize the pressure detected by the pressure sensor 228, which may be performed locally in the controller 115 and/or in the remote device.

Acceleration may be used to disconfirm movement of the conveyance apparatus by detecting acceleration first, which prompts the controller 115 to then detect the first atmospheric air pressure and the second atmospheric air pressure. In other words, detection of acceleration may prompt the pressure sensor 228 to beginning detecting pressure. For example, the method 500 may further include that an acceleration of the conveyance apparatus is detected and then detection of the first atmospheric air pressure proximate the conveyance apparatus at the first time using a pressure sensor located on the conveyance apparatus is commanded and detection of the second atmospheric air pressure proximate the conveyance apparatus at a second time using the pressure sensor located on the conveyance apparatus is commanded.

If air pressure on conveyance system is constantly measured using a pressure sensor 228 on the conveyance apparatus then rates of change in atmospheric air pressure indicating a conveyance apparatus speed that are lower than a threshold speed indicating motion (e.g. <0.6 m/s equivalent) may be attributed to weather. If this lower speed is detected just prior to the first time in block 504 than this lower speed may be used to offset the actual speed detected while in motion. For example, if just prior to the first time the rate of change in atmospheric air pressure indicates a speed of 0.5 m/s, which is lower than a threshold speed indicating motion equivalent to 0.6 m/s, then once motion is actually detected at a speed of 1.5 m/s then the 0.5 m/s may be subtracted from the 1.5 m/s, thus resulting in 1.0 m/s of actual speed. It is understood that 0.5 m/s is an example and the numbers may be higher or lower. Height can then be determined using the rate of speed of 1.0 m/s and the time traveled. The method 500 may further comprise detecting a rate of change in atmospheric air pressure prior to the first time; determining that the conveyance apparatus was not moving prior to the first time in response to the rate of change in atmospheric air pressure prior to the first time; determining a rate of change in atmospheric air pressure between the first time and the second time; and adjusting the height change in response to a difference between the rate of change in atmospheric air pressure prior to the first time and the rate of change in atmospheric air pressure between the first time and the second time.

Static atmospheric air pressure, detected by the static pressure senor 314A may be used to disconfirm movement of the conveyance apparatus. The method 500 may further include that a first static atmospheric air pressure proximate the conveyance apparatus is detected at about the first time using a static pressure sensor 228A located off of the conveyance apparatus and a second static atmospheric air pressure proximate the conveyance apparatus at is detected about the second time using the static pressure sensor 228A located off of the conveyance apparatus. The rate of change in static atmospheric air pressure proximate the conveyance apparatus is determined between the first time and the second time in response to the first static atmospheric air pressure, the second static atmospheric air pressure, the first time, and the second time. It may be determined that the rate of change in static atmospheric air pressure is above a threshold static atmospheric air pressure rate of change, which may mean that that the conveyance apparatus has not moved between the first time and the second time. The height change may be disconfirmed in response to determining that the conveyance apparatus has not moved between the first time and the second time. In other words, the pressure sensor 228 located on the conveyance apparatus may detect a pressure change however that pressure change may be confirmed or disconfirmed by the static pressure sensor 228A located off of the conveyance apparatus. For example, if the static pressure sensor 228A detects a pressure change that may be attributed to a weather change, then the pressure change detected by the pressure sensors 228 may be adjusted or disconfirmed. Once disconfirmed, the controller 115 may reset floor level detection and learning.

Static atmospheric air pressure, detected by the static pressure senor 314A may be used to adjust the height change determined in block 510. The method 500 may further include that a first static atmospheric air pressure proximate the conveyance apparatus is detected at about the first time using a static pressure sensor 228A located off of the conveyance apparatus and a second static atmospheric air pressure proximate the conveyance apparatus at is detected about the second time using the static pressure sensor 228A located off of the conveyance apparatus. The rate of change in static atmospheric air pressure proximate the conveyance apparatus is determined between the first time and the second time in response to the first static atmospheric air pressure, the second static atmospheric air pressure, the first time, and the second time. The height change determined in block 510 may be adjusted in response to the rate of change in static atmospheric air pressure. For example, the static atmospheric air pressure may be subtracted from the atmospheric air pressure detected by the pressure sensor 228. In other words, the pressure sensor 228 located on the conveyance apparatus may detect a pressure change however that pressure change may be adjusted by the static pressure sensor 228A located off of the conveyance apparatus. For example, if the static pressure sensor 228A detects a pressure change that may be attributed to a weather change while the conveyance apparatus is moving, then the pressure change detected by the pressure sensors 228 may be adjusted to remove the pressure change attributed to the weather change, thus leaving only the pressure change attributed to the movement of the conveyance apparatus.

A temperature change typically accompanies a static atmospheric air pressure change, thus detecting a temperature change may be utilized in place of and/or in addition to detecting a change in static atmospheric air pressure. Temperature detected by the temperature sensor 234 may be used to disconfirm movement of the conveyance apparatus. The method 500 may include that a first temperature proximate the conveyance apparatus is detected at about the first time and a second temperature proximate the conveyance apparatus is detected at about the second time. The rate of change in temperature proximate the conveyance apparatus between the first time and the second time is determined in response to the first temperature, the second temperature, the first time, and the second time. The rate of change in temperature may be determined to be above a threshold temperature rate of change and it may be determined that the conveyance apparatus has not moved between the first time and the second time in response to determining that the rate of change in temperature is above the threshold temperature rate of change. In a non-limiting example, the threshold temperature rate of change can be five degrees Fahrenheit per hour, but it is understood that the threshold temperature rate of change can be greater than or less than five degrees Fahrenheit per hour. Then the height change may be disconfirmed in response to determining that the conveyance apparatus has not moved between the first time and the second time. In other words, the pressure sensor 228 located on the conveyance apparatus may detect a pressure change however that pressure change may be confirmed or disconfirmed by the temperature sensor 234. For example, if the temperature sensor 234 detects a temperature change that may be attributed to a weather change while the conveyance apparatus is moving, then the pressure change detected by the pressure sensors 228 may be adjusted or disconfirmed.

Temperature detected by the temperature sensor 234 may be used to confirm movement of the conveyance apparatus. The method 500 may include that a first temperature proximate the conveyance apparatus is detected at about the first time and a second temperature proximate the conveyance apparatus at about the second time. The rate of change in temperature proximate the conveyance apparatus between the first time and the second time is determined in response to the first temperature, the second temperature, the first time, and the second time. The rate of change in temperature may be determined to be below a threshold temperature rate of change and it may be determined that the conveyance apparatus has moved between the first time and the second time in response to determining that the rate of change in temperature is below the threshold temperature rate of change. Then the height change may be confirmed in response to determining that the conveyance apparatus has moved between the first time and the second time. In other words, the pressure sensor 228 located on the conveyance apparatus may detect a pressure change however that pressure change may be confirmed or disconfirmed by the temperature sensor 234. For example, if the temperature sensor 234 does not detect a temperature change that may be attributed to a weather change while the conveyance apparatus is moving, then the pressure change detected by the pressure sensors 228 may be confirmed.

A change in the relative humidity typically accompanies a static atmospheric air pressure change, thus detecting a change in relative humidity may be utilized in place of and/or in addition to detecting a change in static atmospheric air pressure. Relative humidity detected by the humidity sensor 232 may be used to disconfirm movement of the conveyance apparatus. The method 500 may include that a first relative humidity proximate the conveyance apparatus is detected at about the first time and a second relative humidity proximate the conveyance apparatus at about the second time. The rate of change in relative humidity proximate the conveyance apparatus between the first time and the second time is determined in response to the first relative humidity, the second relative humidity, the first time, and the second time. The rate of change in relative humidity may be determined to be above a threshold relative humidity rate of change and it may be determined that the conveyance apparatus has not moved between the first time and the second time in response to determining that the rate of change in relative humidity is above the threshold relative humidity rate of change. Then the height change may be disconfirmed in response to determining that the conveyance apparatus has not moved between the first time and the second time. In other words, the pressure sensor 228 located on the conveyance apparatus may detect a pressure change however that pressure change may be confirmed or disconfirmed by the humidity sensor 232. For example, if the humidity sensors 232 detects a change in relative humidity that may be attributed to a weather change while the conveyance apparatus is moving, then the pressure change detected by the pressure sensors 228 may be adjusted or disconfirmed.

Relative humidity detected by the humidity sensor 232 may be used to confirm movement of the conveyance apparatus. The method 500 may include that a first relative humidity proximate the conveyance apparatus is detected at about the first time and a second relative humidity proximate the conveyance apparatus at about the second time. The rate of change in relative humidity proximate the conveyance apparatus between the first time and the second time is determined in response to the first relative humidity, the second relative humidity, the first time, and the second time. The rate of change in relative humidity may be determined to be below a threshold relative humidity rate of change and it may be determined that the conveyance apparatus has moved between the first time and the second time in response to determining that the rate of change in relative humidity is below the threshold relative humidity rate of change. Then the height change may be confirmed in response to determining that the conveyance apparatus has moved between the first time and the second time. In other words, the pressure sensor 228 located on the conveyance apparatus may detect a pressure change however that pressure change may be confirmed or disconfirmed by the humidity sensor 232. For example, if the humidity sensor 232 does not detect a change in relative humidity that may be attributed to a weather change while the conveyance apparatus is moving, then the pressure change detected by the pressure sensors 228 may be confirmed.

The method 500 may also include that the pressure sensor 228 may be utilized to detect the initiation of movement of the conveyance apparatus and then the double integral of acceleration detected by the IMU sensor 218 may be utilized to detect the location of the conveyance apparatus within the conveyance system.

While the above description has described the flow process of FIG. 5 in a particular order, it should be appreciated that unless otherwise specifically required in the attached claims that the ordering of the steps may be varied.

Detection of the elevator car location (i.e., height, location, or position) and landings 125 visited using an IMU sensor 218 (e.g., an acceleration sensor) as well as with a pressure sensor 228 has some limitations. The precise landing 125 with an associated critical vibration causing a low health score for the elevator system 101 may be uncertain due to external air pressure (i.e., weather) changes while the elevator car 103 moving. It is important to know the precise landing so that a mechanic may quickly find and fix the critical vibration causing the lower health score. This may result in the landing table generation within the remote device 280 being incorrect. The landing table is then utilized by the remote device 280 to determine the current elevator car location (i.e., height, location, or position) and landings 125. One method to exclude external air pressure changes from landing table generation is to use edge computing, which is utilized in method 500 and FIG. 5.

Figure 8:
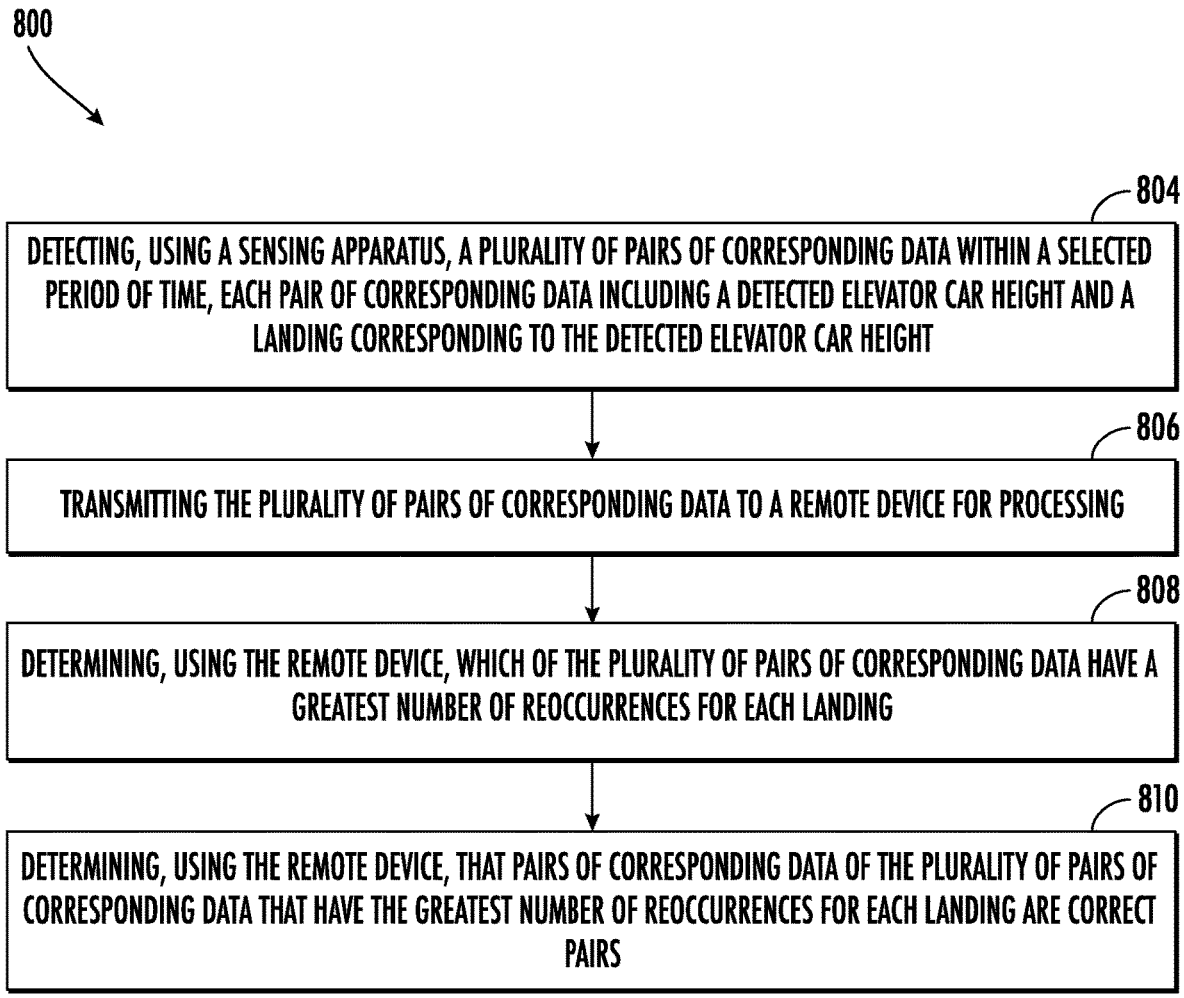
FIG. 8 is a flow chart of a method of monitoring motion of an elevator car within an elevator system, in accordance with an embodiment of the disclosure.

In a second method (e.g., method 600 illustrated in FIG. 6 and method 800 illustrated in FIG. 8) the correct landing table could be corrected or re-built in the remote device 280 when the landing table was generated without edge processing and includes sporadic variable offsets that were caused by external events, such as, for example, external air pressure changes (i.e., weather changes). Method 600 depicted in FIG. 6 and method 800 depicted in FIG. 8 illustrate this second method.

Figure 6:
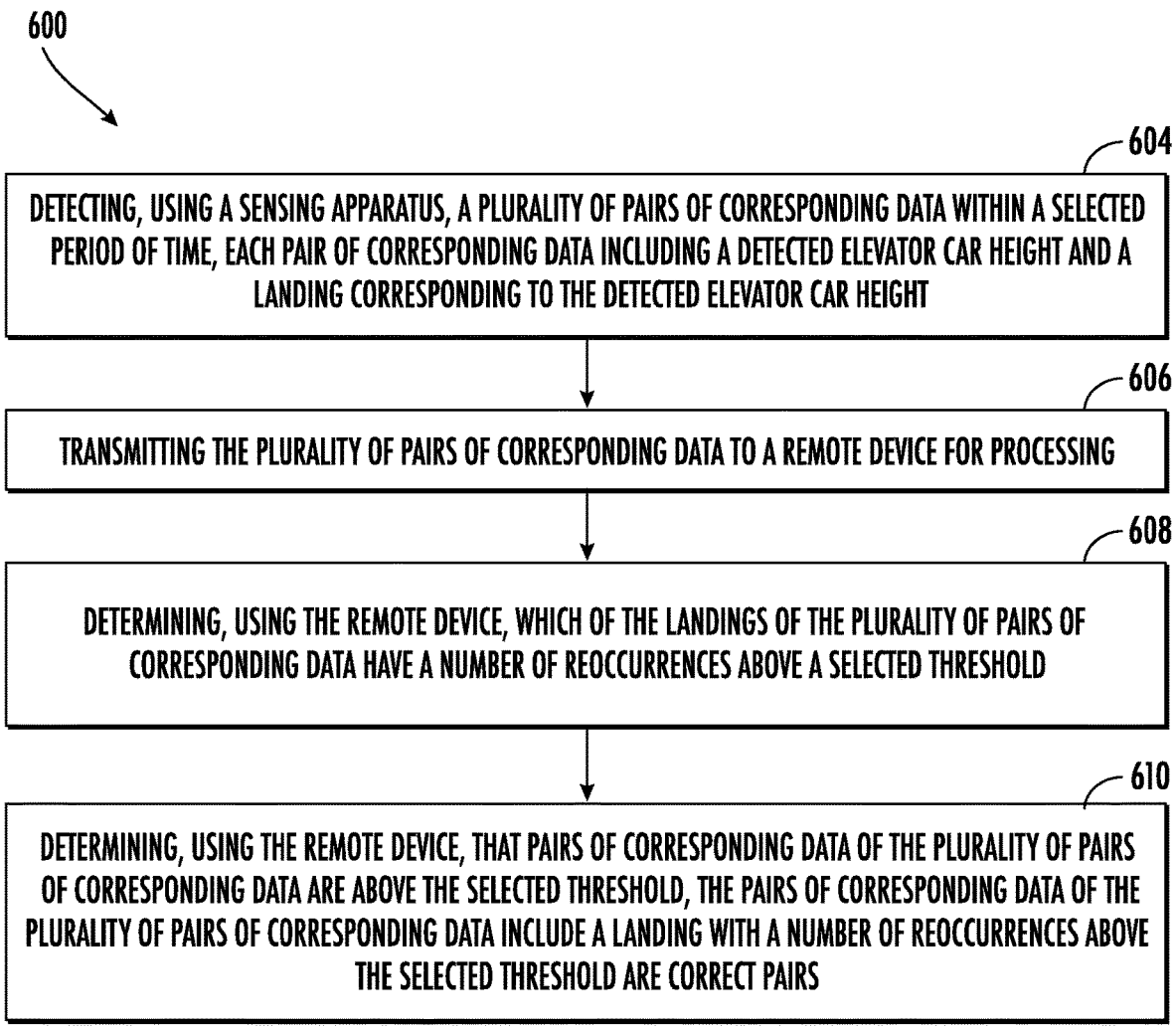
FIG. 6 is a flow chart of a method of monitoring motion of an elevator car within an elevator system, in accordance with an embodiment of the disclosure.
Figure 7:
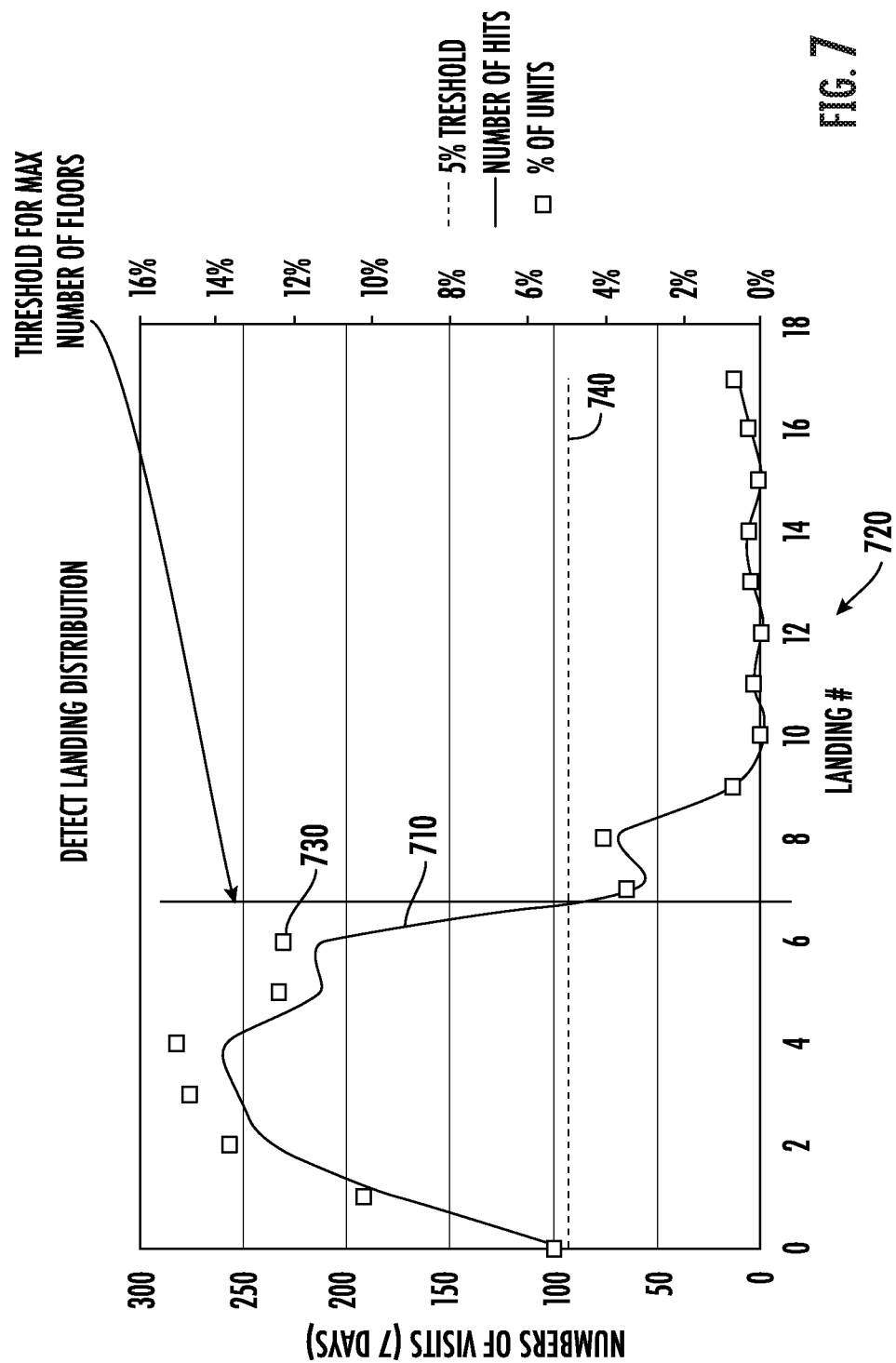
FIG. 7 is a chart plotting a number of visits or hits for each landing of an elevator system during a selected period of time, in accordance with an embodiment of the disclosure.

Referring now to FIGS. 6 and 7, while referencing components of FIGS. 1-5, FIG. 6 shows a flow chart of a method 600 of monitoring motion of an elevator car 103 within an elevator system 101, in accordance with an embodiment of the disclosure. In an embodiment, the method 600 may be performed by at least one of the sensing apparatus 210, the controller 115, and the remote device 280.

At block 604, a sensing apparatus 210 detects a plurality of pairs of corresponding data within a selected period of time. The selected period of time may be a 7 day period in a non-limiting embodiment, but it is understood that the selected period of time may be more or less than a 7 day period. Each pair of corresponding data includes a detected elevator car height and a landing corresponding to the detected elevator car height. The landing may be determined based on the height detected. The sensing apparatus 210 may further comprises a pressure sensor 228 and the plurality of pairs of corresponding data are detected using the pressure sensor 228. The sensing apparatus 210 may further comprises an inertial measurement sensor 218 and the plurality of pairs of corresponding data are detected using the inertial measurement sensor 218. Also, the sensing apparatus 210 may further comprises a combination of the pressure sensor 228 and the inertial measurement sensor 218. The sensing apparatus 210 may normalize at least one of the plurality of pairs of corresponding data within the selected period of time. The normalization may occur periodically, such as, for example, once a day. It is understood that the normalization may occur more or less than once per day. The normalization may be performed if the internal memory is limited. Thus, a maximum number of landings 125 may be detected (e.g. 126) and if the external drift keeps adding new landings 125 than the maximum number of landings 125 are reached and no new landings 125 can be detected. To avoid the sensor this scenario, the sensor is periodically reset to start the first landing 125 at 0. Then lower floors added as minus, higher as positive. Then the overall table may corrected so that the lowest floor is 0.

At block 606, the plurality of pairs of corresponding data are transmitted to a remote device 280 (e.g., cloud computing device) for processing. At block 608, the remote device 280 determines which of the landings of the plurality of pairs of corresponding data have a number of reoccurrences above a selected threshold. The selected threshold 5% or 2 sigma in normal distribution, in a non-limiting embodiment. For example, the selected threshold being 5% means that 5% of the data is below a waterline (i.e., the floors higher than all the other floor hits combining to 95%). Additionally, the selected threshold could be the max. number of landings 125 if none from independent other source. For example, information entered into system when the mechanic is on site (e.g. via an APP) or detected from the elevator control system 115 (e.g. service tool port) see change in FIG. 7. It is under stood that the selected threshold may be more or less than 5% or 2 sigma.

As illustrated in chart 700 of FIG. 7, a number of visits or hits 710 within a selected time period (e.g., 7 days) is shown plotted for each landing 720. The percentage of the total number of hits for each landing is also shown at 730. The landings that have a number of hits above a selected threshold 740 may be determined to be correct landing locations. The landings that have a number of hits below the selected threshold 740 may be determined to be incorrect landing locations. For example, as shown in FIG. 7, landings 7-17 are below the selected threshold 740 and thus may not exist because they may have resulted from external drift, as aforementioned. In the instance that an exact number of landings is known the statistics have a precise threshold. In the instance that the number of landings is unknown then "2 sigma" is good statics threshold, but "2 sigma" can be modified with AI, such as, for example, human in the loop feedback about landing level accuracy of this algorithm can help the model learn a correct threshold criteria.

At block 610, the remote device 280 determines that pairs of corresponding data of the plurality of pairs of corresponding data are above the selected threshold. The pairs of corresponding data of the plurality of pairs of corresponding data include a landing with a number of reoccurrences above the selected threshold 740 are correct pairs. This is performed to narrow down the detected landings 125 to the correct landings 125. The remote device 280 may save the correct pairs in a landing table generated and stored on the remote device 280. Additionally, the remote device 280 may determine that pairs of corresponding data of the plurality of pairs of corresponding data that do not include a landing with a number of reoccurrences above the selected threshold are incorrect pairs. The remote device 280 may remove the incorrect pairs from the landing table generated and stored on the remote device 280.

Once the correct landings 125 have been identified, then the system may be able to associated newly detected landings with the previously detected landings 125 that have been identified as correct. The method 600 may further include that the sensing apparatus detects a first pair of corresponding data at a first time. The first time may occur at a first elevator car location. The first pair of corresponding data including a first detected elevator car height at the first time and a first landing corresponding to the first detected elevator car height at the first time. The sensing apparatus 210 then transmits the first pair of corresponding data to the remote device 280 for processing and the remote device 280 matches the first pair of corresponding data to one of the correct pairs to determine an actual landing of the elevator car at the first time.

While the above description has described the flow process of FIG. 6 in a particular order, it should be appreciated that unless otherwise specifically required in the attached claims that the ordering of the steps may be varied.

Referring now to FIGS. 8 and 9, while referencing components of FIGS. 1-5, FIG. 8 shows a flow chart of a method 800 of monitoring motion of an elevator car 103 within an elevator system 101, in accordance with an embodiment of the disclosure. In an embodiment, the method 800 may be performed by at least one of the sensing apparatus 210, the controller 115, and the remote device 280.

At block 804, a sensing apparatus 210 detects a plurality of pairs of corresponding data 980 within a selected period of time. The selected period of time may be a 7 day period in a non-limiting embodiment, but it is understood that the selected period of time may be more or less than a 7 day period Each pair of corresponding data 980 includes a detected elevator car height and a landing corresponding to the detected elevator car height. The landing may be determined based on the height detected. The sensing apparatus 210 may further comprises a pressure sensor 228 and the plurality of pairs of corresponding data 980 are detected using the pressure sensor 228. The sensing apparatus 210 may further comprises an inertial measurement sensor 218 and the plurality of pairs of corresponding data 980 are detected using the inertial measurement sensor 218. The sensing apparatus 210 may normalize at least one of the plurality of pairs of corresponding data 980 within the selected period of time. The normalization may occur periodically, such as, for example, once a day.

At block 806, the plurality of pairs of corresponding data 980 are transmitted to a remote device 280 (e.g., cloud computing device) for processing. At block 808, the remote device 280 determines which of the plurality of pairs of corresponding data 980 have a greatest number of reoccurrences for each landing. As illustrated in chart 900 of FIG. 9, a number of visits or hits 910 within a selected time period (e.g., 7 days) is shown plotted for each height 920 and each landing 940 determined to be at the height 920. Each shape plotted on the chart represents a pair of corresponding data 980 and the pairs of corresponding data 980 with the most visits or hits 910 for each height is determined to be correct. For example, at a height of 0 m landing "0" received the most visits or hits 910 within a selected time period, at a height of 3 m landing "1" received the most visits or hits 910 within a selected time period, at a height of 6 m landing "2" received the most visits or hits 910 within a selected time period, at a height of 9 m landing "3" received the most visits or hits 910 within a selected time period, at a height of 12 m landing "4" received the most visits or hits 910 within a selected time period, at a height of 15 m landing "5" received the most visits or hits 910 within a selected time period, and at a height of 18 m landing "6" received the most visits or hits 910 within a selected time period.

At block 810, the remote device 280 determines that pairs of corresponding data 980 of the plurality of pairs of corresponding data 980 that have the greatest number of reoccurrences above the selected threshold are correct pairs.

The remote device 280 may save the correct pairs in a landing table generated and stored on the remote device 280. Additionally, the remote device 280 may determine that pairs of corresponding data 980 of the plurality of pairs of corresponding data 980 that do not have a minimum number of hits or visits are incorrect pairs. The remote device 280 may remove the incorrect pairs from the landing table generated and stored on the remote device 280.

The method 600 may further comprise: that the sensing apparatus detects a first pair of corresponding data 980 at a first time. The first time may occur at a first elevator car location. The first pair of corresponding data 980 including a first detected elevator car height at the first time and a first landing corresponding to the first detected elevator car height at the first time. The sensing apparatus 210 then transmits the first pair of corresponding data 980 to the remote device 280 for processing and the remote device 280 matches the first pair of corresponding data 980 to one of the correct pairs to determine an actual landing of the elevator car at the first time.

While the above description has described the flow process of FIG. 8 in a particular order, it should be appreciated that unless otherwise specifically required in the attached claims that the ordering of the steps may be varied.

Referring now to FIGS. 10 and 11, with continued reference to FIGS. 1-9. FIG. 10 shows a flow chart of a method 1000 of monitoring health of an elevator or escalator system 101, in accordance with an embodiment of the present disclosure. FIG. 11 illustrates a computing device 400 generating a graphical user interface 470 via display device 450 for viewing and interacting with the application 440 illustrated in FIG. 2. The computing device 400 may be a desktop computer, laptop computer, smart phone, tablet computer, smart watch, or any other computing device known to one of skill in the art. In the example shown in FIG. 11, the computing device 400 is a touchscreen smart phone. The computing device 400 includes an input device 452, such as, example, a mouse, a keyboard, a touch screen, a scroll wheel, a scroll ball, a stylus pen, a microphone, a camera, etc. In the example shown in FIG. 11, since the computing device 400 is a touchscreen smart phone, then the display device 450 also functions as an input device 452. FIG. 11 illustrates a graphical user interface 470 generated on the display device 450 of the computing device 400. A user may interact with the graphical user interface 470 through a selection input, such as, for example, a "click", "touch", verbal command, gesture recognition, or any other input to the user interface 470.

At block 1004, a sensing apparatus detects sensor data 202, the sensor data 202 including at least one of an acceleration 312 of the elevator car 103, temperature data 316 of the elevator system 101, and pressure data 314 proximate the elevator car 103.

At block 1006, a health level of the elevator system 101 is determined in response to at least one of the acceleration 312 of the elevator car 103, the temperature data 316 of the elevator system 101, and the pressure data 314 proximate the elevator car 103.

At block 1008, it is determined whether the health level is greater than a selected threshold. At block 1009, it is determined that there is a potential health issue 1120 if the health level is greater than the selected threshold. In an embodiment, the potential health issue may relate to a landing door issue, as illustrated in FIG. 11. In an embodiment, the potential health issue may relate to a guide rail of the elevator shaft, as illustrated in FIG. 11.

At block 1010, one or more possible locations 1110 are determined for the health level within an elevator shaft 117. The one or more possible locations 1110 determined at block 1010 for the health level within an elevator shaft 117 by the method 600 or method 800.

At block 1012, a probability 1160 of each of the one or more possible locations within the elevator shaft 117 is determined. At block 1014, displaying the probability 1160 of the health level being at a plurality of locations throughout an elevator shaft 117 on a display device 450 of a computing device 400. In an embodiment, the probability 1160 of the health level being at a plurality of locations throughout an elevator shaft 117 on a display device 450 of a computing device 400 is displayed via a heat map as illustrated in FIG. 11. In the heat map warm colors (e.g., red) may represent higher probabilities and cool colors (e.g., green) may represent lower probabilities. In another embodiment, the probability 1160 of the health level being at a plurality of locations throughout an elevator shaft 117 is displayed on a display device 450 of a computing device is displayed via a numerical percentage, as illustrated in FIG. 11. In another embodiment, the probability 1160 of the health level being at a plurality of locations throughout an elevator shaft 117 on a display device 450 of a computing device 400 is displayed via a heat map and a numerical percentage, as illustrated in FIG. 11.

While the above description has described the flow process of FIG. 10 in a particular order, it should be appreciated that unless otherwise specifically required in the attached claims that the ordering of the steps may be varied.

The term "about" is intended to include the degree of error associated with measurement of the particular quantity and/or manufacturing tolerances based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

Those of skill in the art will appreciate that various example embodiments are shown and described herein, each having certain features in the particular embodiments, but the present disclosure is not thus limited. Rather, the present disclosure can be modified to incorporate any number of variations, alterations, substitutions, combinations, sub-combinations, or equivalent arrangements not heretofore described, but which are commensurate with the scope of the present disclosure. Additionally, while various embodiments of the present disclosure have been described, it is to be understood that aspects of the present disclosure may include only some of the described embodiments. Accordingly, the present disclosure is not to be seen as limited by the foregoing description, but is only limited by the scope of the appended claims.

What is claimed is:

1. A method of monitoring motion of an elevator car within an elevator system, the method comprising:
    detecting, using a sensing apparatus, a plurality of pairs of corresponding data within a selected period of time, each pair of corresponding data including a detected elevator car height and a landing corresponding to the detected elevator car height;
    transmitting the plurality of pairs of corresponding data to a remote device for processing;
    determining, using the remote device, which of the plurality of pairs of corresponding data have a greatest number of reoccurrences for each landing; and
    determining, using the remote device, that pairs of corresponding data of the plurality of pairs of corresponding data that have the greatest number of reoccurrences for each landing are correct pairs.

2. The method of claim 1, further comprising:
    detecting, using a sensing apparatus, a first pair of corresponding data at a first time, the first pair of corresponding data including a first detected elevator car height at the first time and a first landing corresponding to the first detected elevator car height at the first time;
    transmitting the first pair of corresponding data to the remote device for processing; and
    matching, using the remote device, the first pair of corresponding data to one of the correct pairs to determine an actual landing of the elevator car at the first time.

3. The method of claim 1, further comprising:
    determining, using the remote device, that pairs of corresponding data of the plurality of pairs of corresponding data that do not have a minimum number of hits or visits are incorrect pairs.

4. The method of claim 3, further comprising:
    removing, using the remote device, the incorrect pairs from a landing table generated and stored on the remote device.

5. The method of claim 1, further comprising:
    saving, using the remote device, the correct pairs in a landing table generated and stored on the remote device.

6. The method of claim 1, wherein the sensing apparatus further comprises: at least one of a pressure sensor and an inertial measurement sensor, wherein the plurality of pairs of corresponding data are detected using at least one of the pressure sensor and the inertial measurement sensor.

7. The method of claim 1, wherein the sensing apparatus further comprises: at least one of a temperature sensor and a humidity sensor, wherein the plurality of pairs of corresponding data are detected using at least one of the temperature sensor and the humidity sensor.

8. The method of claim 1, further comprising:
    normalizing, using a sensing apparatus, at least one of the plurality of pairs of corresponding data within the selected period of time.

9. A computer program product embodied on a non-transitory computer readable medium, the computer program product including instructions that, when executed by a processor, cause the processor to perform operations comprising:
    detecting, using a sensing apparatus, a plurality of pairs of corresponding data within a selected period of time, each pair of corresponding data including a detected elevator car height and a landing corresponding to the detected elevator car height;
    transmitting the plurality of pairs of corresponding data to a remote device for processing;
    determining, using the remote device, which of the plurality of pairs of corresponding data have a greatest number of reoccurrences for each landing; and
    determining, using the remote device, that pairs of corresponding data of the plurality of pairs of corresponding data that have the greatest number of reoccurrences for each landing are correct pairs.

10. The computer program product of claim 9, wherein the operations further comprise:
   detecting, using a sensing apparatus, a first pair of corresponding data at a first time, the first pair of corresponding data including a first detected elevator car height at the first time and a first landing corresponding to the first detected elevator car height at the first time;
   transmitting the first pair of corresponding data to the remote device for processing; and
   matching, using the remote device, the first pair of corresponding data to one of the correct pairs to determine an actual landing of the elevator car at the first time.

11. The computer program product of claim 9, wherein the operations further comprise:
   determining, using the remote device, that pairs of corresponding data of the plurality of pairs of corresponding data that do not have a minimum number of hits or visits are incorrect pairs.

12. The computer program product of claim 11, wherein the operations further comprise:
   removing, using the remote device, the incorrect pairs from a landing table generated and stored on the remote device.

13. The computer program product of claim 9, wherein the sensing apparatus further comprises: at least one of a pressure sensor and an inertial measurement sensor, wherein the plurality of pairs of corresponding data are detected using at least one of the pressure sensor and the inertial measurement sensor.

14. The computer program product of claim 9, wherein the sensing apparatus further comprises: at least one of a temperature sensor and a humidity sensor, wherein the plurality of pairs of corresponding data are detected using at least one of the temperature sensor and the humidity sensor.

15. The computer program product of claim 9, wherein the operations further comprise:
   normalizing, using a sensing apparatus, at least one of the plurality of pairs of corresponding data within the selected period of time.

* * * * *